(12) United States Patent
Furutani

(10) Patent No.: US 11,274,977 B2
(45) Date of Patent: Mar. 15, 2022

(54) SEMICONDUCTOR DEVICE INCLUDING SENSOR

(71) Applicant: Micron Technology, Inc., Boise, ID (US)

(72) Inventor: Kiyohiro Furutani, Tokyo (JP)

(73) Assignee: Micron Technology, Inc., Boise, ID (US)

(*) Notice: Subject to any disclaimer, the term of this patent is extended or adjusted under 35 U.S.C. 154(b) by 575 days.

(21) Appl. No.: 16/228,377

(22) Filed: Dec. 20, 2018

(65) Prior Publication Data

US 2019/0120704 A1 Apr. 25, 2019

Related U.S. Application Data

(62) Division of application No. 14/707,951, filed on May 8, 2015, now Pat. No. 10,168,233.

(51) Int. Cl.
*G01K 7/00* (2006.01)
*G01K 13/00* (2021.01)
*G01K 7/01* (2006.01)

(52) U.S. Cl.
CPC .............. *G01K 13/00* (2013.01); *G01K 7/01* (2013.01)

(58) Field of Classification Search
CPC ................................. G01K 13/00; G01K 7/01
See application file for complete search history.

(56) References Cited

U.S. PATENT DOCUMENTS

| 5,378,950 | A | 1/1995 | Takamoto et al. | |
|---|---|---|---|---|
| 8,545,095 | B2* | 10/2013 | Chu | G11C 7/04 374/163 |
| 8,842,486 | B2* | 9/2014 | Do | G11C 29/40 365/201 |
| 9,007,863 | B1* | 4/2015 | Song | G11C 11/40615 365/222 |
| 10,168,233 | B2 | 1/2019 | Furutani | |
| 2006/0109225 | A1 | 5/2006 | Haga et al. | |
| 2011/0205826 | A1* | 8/2011 | Kuroda | G11C 11/40626 365/222 |
| 2012/0063247 | A1* | 3/2012 | Chu | G11C 11/40626 365/194 |
| 2013/0169347 | A1* | 7/2013 | Kim | G06F 1/206 327/513 |
| 2013/0242674 | A1 | 9/2013 | Furutani et al. | |

(Continued)

FOREIGN PATENT DOCUMENTS

JP 2002-343079 11/2002

*Primary Examiner* — Lisa M Caputo
*Assistant Examiner* — Nasir U. Ahmed
(74) *Attorney, Agent, or Firm* — Dorsey & Whitney LLP

(57) ABSTRACT

Disclosed here is an apparatus that includes a sensor including a plurality of sense nodes, a plurality of first latch circuits including a plurality of first input nodes and a plurality of first output nodes, respectively, the plurality of first input nodes coupled to the plurality of sense nodes, respectively, a plurality of second latch circuits including a plurality of second input nodes and a plurality of second output nodes, respectively, the plurality of second input nodes coupled to the plurality of first output nodes, respectively, and a selector including a plurality of third input nodes coupled respectively to the plurality of first output nodes, a plurality of fourth input nodes coupled respectively to the plurality of second output nodes and a plurality of third output nodes.

21 Claims, 8 Drawing Sheets

(56) References Cited

U.S. PATENT DOCUMENTS

2014/0003161 A1* 1/2014 Son ................. G11C 29/50016
                                                          365/189.02
2014/0029367 A1* 1/2014 Jung ................ G11C 29/50016
                                                          365/222

* cited by examiner

SEMICONDUCTOR DEVICE INCLUDING SENSOR

CROSS-REFERENCE TO RELATED APPLICATIONS

This application is a divisional application of U.S. patent application Ser. No. 14/707,951, filed May 8, 2015 and issued as U.S. Pat. No. 10,168,233 on Jan. 1, 2019, which application claims the benefit of priority from Japanese Patent Application No. 2014-100510 filed on May 14, 2014. The aforementioned applications, and issued patent, are incorporated by reference herein in their entirety and for all purposes.

BACKGROUND OF THE INVENTION

Field of the Invention

The present invention relates to a semiconductor device and particularly to a semiconductor device including a physical quantity sensor that measures physical quantities, such as temperatures.

Description of Related Art

A semiconductor device, such as DRAM (Dynamic Random Access Memory), may include a temperature sensor that measures a chip temperature. Temperature information obtained by the temperature sensor is used for operations of various circuits, such as a refresh control unit. (Japanese Patent Application Laid Open No. 2002-343079)

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be realized using the teachings of the present invention and that the invention is not limited to the embodiments illustrated for explanatory purposes.

Figure 1:
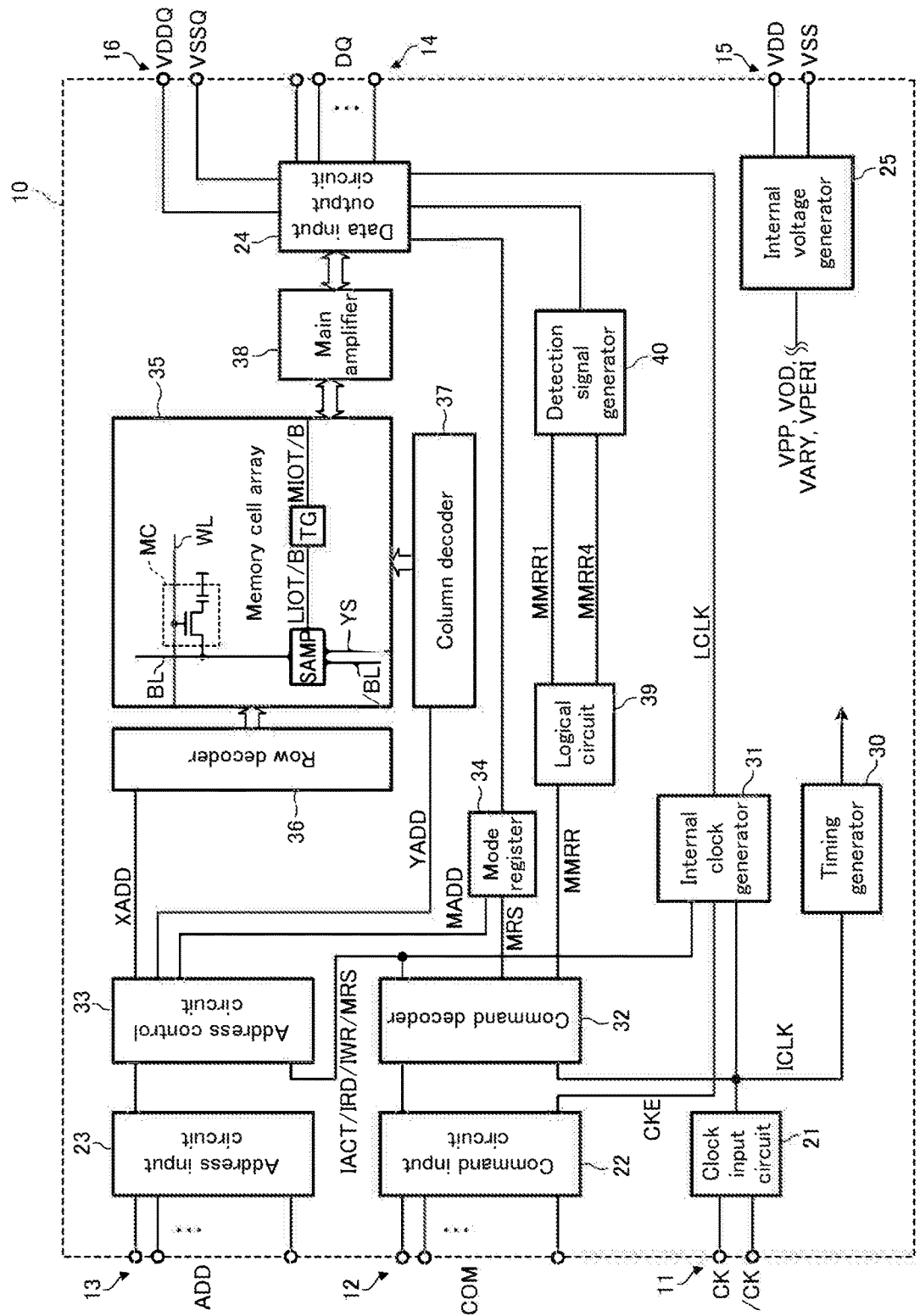
FIG. 1 is a block diagram of a semiconductor device according to one embodiment of the present invention.

FIG. 1 is a block diagram of a semiconductor device 10 according to one embodiment of the present invention.

The semiconductor device 10 according to this embodiment is a DRAM. However, the semiconductor device according to this embodiment is not limited to the DRAM. The present invention may be applied also to other semiconductor memory devices, such as a SRAM, ReRAM, and flash memory, and also to logic-processing semiconductor memory devices, such as a CPU and DSP.

Referring now to FIG. 1, the semiconductor device 10 according to a first embodiment of the present invention includes a clock terminal group 11, a command terminal group 12, an address terminal group 13, a data input/output terminal group 14, and a power terminal group 15, which work as external terminals. These external terminals, i.e., the clock terminal group 11, the command terminal group 12, the address terminal group 13, the data input/output terminal group 14, and the power terminal group 15 are connected to a clock input circuit 21, a command input circuit 22, an address input circuit 23, a data input/output circuit 24, and an internal voltage generator 25, respectively. The semiconductor device 10 also includes a power terminal group 16 serving as dedicated terminals for the data input/output circuit 24. The data input/output circuit 24 includes data output buffers.

The semiconductor device 10 further includes a timing generator 30, an internal clock generator 31, a command decoder 32, an address control circuit 33, a mode register 34, a memory cell array 35, a row decoder 36, a column decoder 37, a main amplifier 38, a logic circuit 39, and a detection signal generator 40.

The clock terminal group 11 receives external clock signals CK and /CK.

The clock input circuit 21 receives the incoming external clock signals CK and /CK from the clock terminal group 11 and generates internal clock signals ICLK synchronized with the external clock signals CK and /CK. The clock input circuit 21 then outputs the internal clock signal ICLK to the timing generator 30 and to the internal clock generator 31.

Based on the internal clock signal ICLK, the timing generator 30 generates various internal clocks that are timing-adjusted. Various internal clocks generated by the timing generator 30 are supplied to circuit blocks included in the semiconductor device 10.

The internal clock generator 31 is, for example, a DLL circuit. The internal clock generator 31 adjusts the phase of the internal clock signal ICLK, and thereby generates an input/output clock signal LCLK. The internal clock generator 31 carries out a phase adjusting operation to set a phase difference between the external clock signal CK or /CK and the input/output clock signal LCLK to a given phase difference value. The internal clock generator 31 supplies the input/output clock signal LCLK to the data input/output circuit 24.

The command terminal group 12 receives a command signal COM. The command signal COM includes, for example, a row address strobe signal /RAS, a column address strobe signal /CAS, a chip select signal /CS, a clock enable signal CKE., etc.

The command input circuit 22 receives the incoming command signal COM from the command terminal group 12 and outputs the command signal COM to the command decoder 32. The clock enable signal CKE of the command signal COM is output to the internal clock generator 31.

The command decoder 32 receives the command signal COM. The command decoder 32 saves, decodes, and counts command signals, and thereby generates internal command signals. The command decoder 32 generates these internal command signals to include an active command IACT, read command IRD, write command IWR, mode register setting command MRS, and mode register read command MMRR.

The address terminal group 13 receives an address signal ADD.

The address input circuit 23 receives the incoming address signal ADD from the address terminal group 13 and outputs the address signal ADD to the address control circuit 33.

The address control circuit 33 receives the incoming address signal ADD from the address input circuit 23. When the mode register setting command MRS is activated, the address control circuit 33 outputs a mode signal MADD including the address signal ADD to the mode register 34. The address control circuit 33 outputs an address signal ADD representing a row address XADD to the row decoder 36, and outputs an address signal ADD representing a column address YADD to the column decoder 37.

The mode register 34 is the register with which operational parameters of the semiconductor device 10 (e.g., burst length or CAS latency) are registered. The mode register 34 receives the mode register setting command MRS from the command decoder 32 and the mode signal MADD from the address control circuit 33, and registers an operational parameter that is specified based on the mode register setting command MRS and the mode signal MADD.

The memory cell array 35 includes multiple word lines WL, multiple bit lines BL and /BL, and multiple memory cells MC. Each memory cell MC is specified by a word line WL and a bit line BL or /BL.

The row decoder 36 receives the incoming row address XADD from the address control circuit 33 and an incoming active command IACT from the command decoder 32. Upon receiving the active command IACT, the row decoder 36 selects the word line WL corresponding to the row address from the multiple word lines WL in the memory cell array 35.

In the memory cell array 35, the word lines WL intersect with the bit lines BL and /BL, and the memory cells MC are arranged at their intersections. For simpler description, FIG. 1 depicts one word line WL, a pair of bit lines BL and /BL, and one memory cell MC. The bit lines BL and /BL are connected to a corresponding sense amplifier SAMP.

The column decoder 37 receives the incoming column address YADD from the address control circuit 33 and further receives an incoming read command IRD and a write command IWR from the command decoder 32. Upon receiving the column address YADD and the read command IRD or write command IWR, the column decoder 37 activates a column selection signal YS corresponding to the column address YADD.

When the column selection signal YS is activated, the sense amplifier SAMP corresponding to the column selection signal YS is connected to a pair of local I/O lines LIOT and LIOB, which are connected to a pair of main I/O lines MIOT and MIOB via a connection circuit TG. The pair of main I/O lines MIOT and MIOB are connected to the main amplifier 38.

When a read operation is carried out (when the read command TRD is issued), data stored in memory cells MC selected by word lines WL are amplified by the sense amplifiers SAMP corresponding to the memory cells MC. From that data, a piece of data amplified by a sense amplifier SAMP selected by the column decoder 37 is transferred to the main amplifier 38 via the pair of local I/O lines LIOT and LIOB and the pair of main I/O lines MIOT and MIOB. The main amplifier 38 further amplifies the data transferred thereto. Data DQ output from the main amplifier 38 is transferred through the data input/output circuit 24 to the data input/output terminal group 14 and is output therefrom to the outside.

When a write operation is carried out (when the write command IWR is issued), data DQ received by the data input/output terminal 14 is transferred to the data input/output circuit 24, the main amplifier 38, the pair of main I/O lines MIOT and MIOB, and the pair of local I/O lines LIOT and LIOB in order. The transferred data DQ is then written to a memory cell MC corresponding to a sense amplifier SAMP selected by the column decoder 37, via the SAMP.

The data input/output circuit 24 receives the incoming input/output clock signal LCLK from the internal clock generator 31. When the read operation is carried out, the data input/output circuit 24 outputs the data DQ to the data input/output terminal group 14 in synchronization with the input/output clock signal LCLK.

The power terminal group 15 receives a higher source voltage VDD and a lower source voltage VSS.

The internal voltage generator 25 receives the incoming source voltages VDD and VSS from the power terminal group 15 and generates internal voltages, such as a voltage VPP, voltage VOD, voltage VARY, and voltage VPERI.

The voltage VPP is used mainly by the row decoder 36. The voltages VOD and VARY are used mainly by the sense amplifier SAMP. The voltage VPERI is used as an operating voltage for other peripheral circuits.

The power terminal group 16 receives a higher source voltage VDDQ and a lower source voltage VSSQ. The voltages VDDQ and VSSQ are used as operating voltages for the data input/output circuit 24.

In this specification, a signal name with "I" appended at the beginning represents a complementary signal to an original signal defined by the signal name, or means a low-active signal. The external clock signal CK and the external clock signal /CK are, therefore, complementary to each other.

The logic circuit 39 receives a mode register read command MMRR. When receiving the mode register read command MMRR, the logic circuit 39 activates a control signal MMRR1 and a control signal MMRR4 in order. The control signals MMRR1 and MMRR4 are input to the detection signal generator 40.

In synchronization with the control signals MMRR1 and MMRR4, the detection signal generator 40 supplies a detection signal COP to the data input/output circuit 24, which then outputs the detection signal COP to the outside of the semiconductor device 10 through the data input/output terminal group 14.

Figure 2:
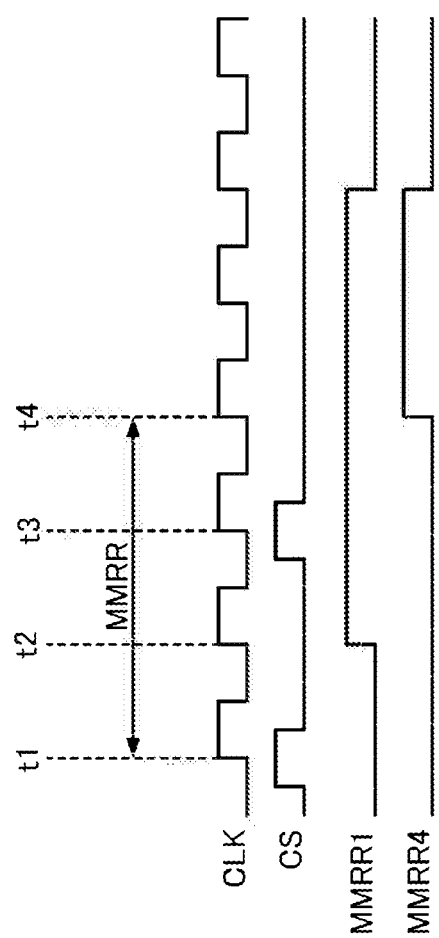
FIG. 2 is a waveform chart showing shift timing of control signals.

FIG. 2 is a waveform chart showing shift timing of the control signals MMRR1 and MMRR4.

As shown in FIG. 2, the mode register read command MMRR is specified as a three-clock-cycle command.

At time t1 at which a chip select signal CS is at a high voltage level, the control signals MMRR1 and MMRR4 are at a low voltage level. At time t2 at which the chip select signal CS is at the low voltage level, the control signal MMRR1 shifts to the high voltage level. At time t3 at which the chip select signal CS is at the high voltage level, the control signal MMRR1 is at the high voltage level while the control signal MMRR4 is at the low voltage level. At time t4 at which the chip select signal CS is at the low voltage level, the control signal MMRR4 shifts to the high voltage level.

In this manner, when the mode register read command MMRR is issued, the control signal MMRR1 shifts to the high voltage level first and after the passage of 2 clock cycles, the control signal MMRR4 then shifts to the high voltage level.

Figure 3:
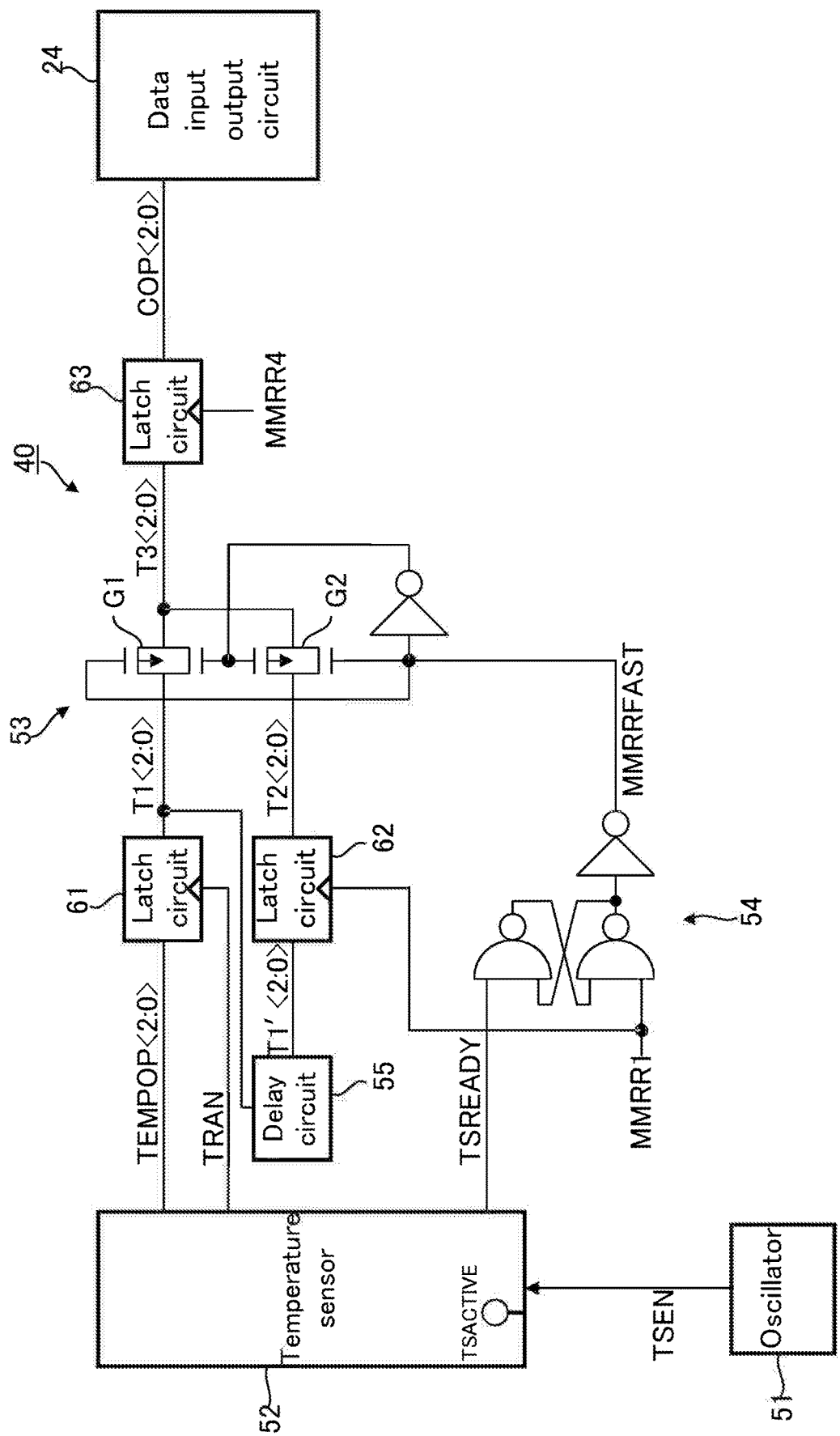
FIG. 3 is a block diagram of a configuration of a detection signal generator.

FIG. 3 is a block diagram of a configuration of the detection signal generator 40 according to this embodiment.

As shown in FIG. 3, the detection signal generator 40 has an oscillator 51 and a temperature sensor 52.

The oscillator 51 automatically generates a cyclic oscillation signal TSEN, which does not synchronize with the external clock signals CK and /CK.

The temperature sensor 52 performs temperature measurement in synchronization with the oscillation signal TSEN, and outputs a measured chip temperature as a 3-bit sense signal TEMPOP. During a temperature measurement period, the temperature sensor 52 activates a monitoring signal TSREADY at a monitoring node. When the temperature measurement is over and the value of the sense signal TEMPOP is defined, a control signal TRAN is activated.

The detection signal generator 40 also has latch circuits 61 to 63, a selector 53, and an SR latch circuit 54.

The first latch circuit 61 latches the sense signal TEMPOP in synchronization with a rising edge of the control signal TRAN. A 3-bit detection signal T1 output from the first latch circuit 61 is supplied to a first input node of the selector 53.

The second latch circuit 62 latches a detection signal T1' in synchronization with a rising edge of the control signal MMRR1. The detection signal T1' is a signal created by delaying the detection signal T1, which is output from the first latch circuit 61, through a delay circuit 55. A 3-bit detection signal T2 output from the second latch circuit 62 is supplied to a second input node of the selector 53.

The third latch circuit 63 latches a detection signal T3 in synchronization with a rising edge of the control signal MMRR4. The detection signal T3 is output from the selector 53. A 3-bit detection signal COP output from the third latch circuit 63 is supplied to the data input/output circuit 24.

The selector 53 selects either the detection signal T1 or detection signal T2, based on a control signal MMRRFAST, and outputs the selected detection signal as the detection signal T3. The selector 53 includes two transfer gates G1 and G2 switching on independently of each other. The gate electrodes of transistors respectively making up the transfer gates G1 and G2 are supplied with the incoming control signal MMRRFAST or the reverse signal thereto.

When the control signal MMRRFAST is at low voltage level, the transfer gate G1 is switched on, which connects the first latch circuit 61 to the third latch circuit 63. In this case, the detection signal T3 is identical with the detection signal T1. When the control signal MMRRFAST is at the high voltage level, in contrast, the transfer gate G2 is switched on, which connects the second latch circuit 62 to the third latch circuit 63. In this case, the detection signal T3 is identical with the detection signal T2.

The control signal MMRRFAST is generated by the SR latch circuit 54, which is a selection signal generator. A set node of the SR latch circuit (a selector control circuit) 54 receives the control signal MMRR1, while a reset node of the SR latch circuit 54 receives the monitoring signal TSREADY. In such a configuration, when the control signal MMRR1 shifts to the high voltage level in a period during which the monitoring signal TSREADY stays at the low voltage level, the control signal MMRRFAST shifts to the high voltage level. Afterward, when the control signal MMRR1 shifts to the low voltage level, the control signal MMRRFAST shifts back to the low voltage level.

Figure 4:
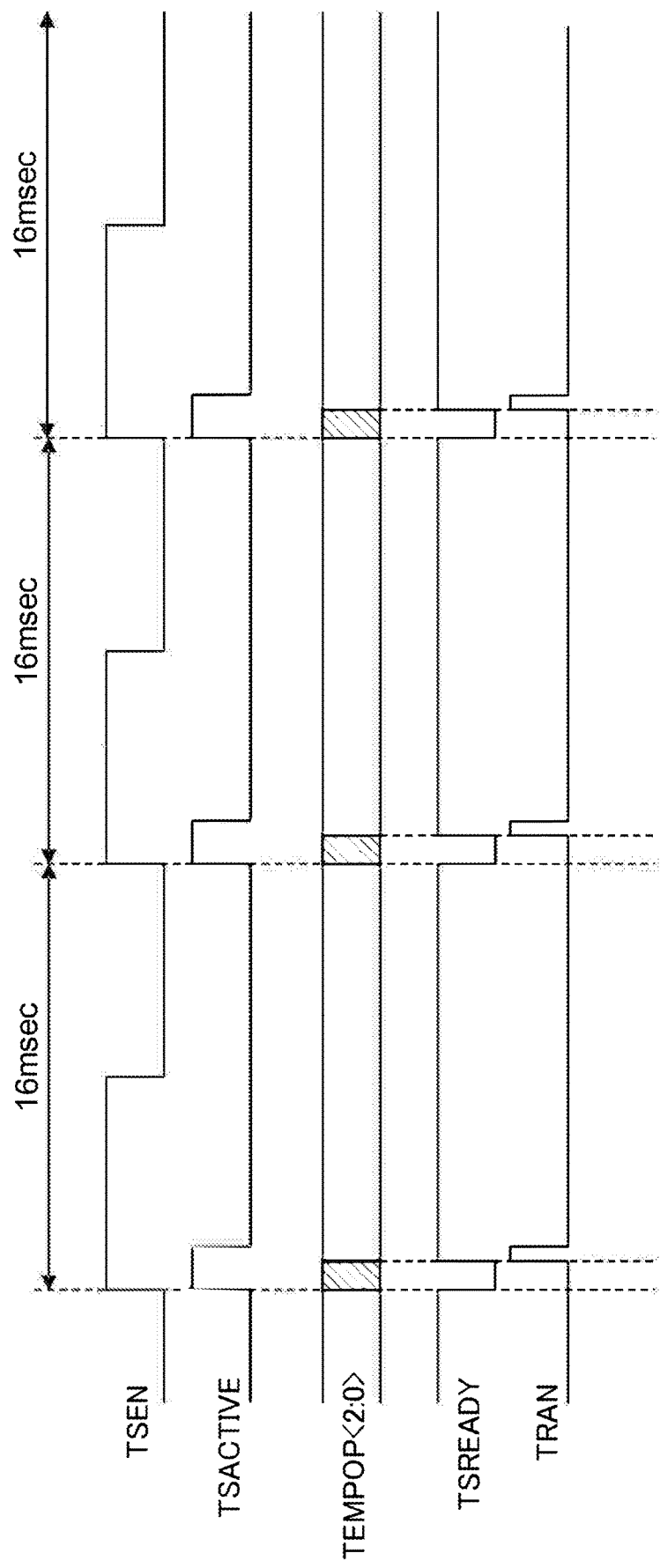
FIG. 4 is a timing chart for explaining an operation of a temperature sensor.

FIG. 4 is a timing chart for explaining an operation of the temperature sensor 52.

The temperature sensor 52 operates in synchronization with the cyclically activated oscillation signal TSEN. In the example of FIG. 4, the cycle of the oscillation signal TSEN is 16 msec.

When the oscillation signal TSEN rises, an active signal TSACTIVE, which is an internal signal of the temperature sensor 52, is temporarily activated to the high voltage level. A period during which the active signal TSACTIVE stays at the high voltage level is equivalent to the operation period of the temperature sensor 52.

When the active signal TSACTIVE is activated to the high voltage level, the temperature sensor 52 measures a chip temperature, and updates the value of the sense signal TEMPOP based on the measured chip temperature. During a period of updating the value of the sense signal TEMPOP, the value of the sense signal TEMPOP is temporarily left undefined. In FIG. 4, hatched periods each represent a period during which the value of the sense signal TEMPOP is left undefined. During this period, the temperature sensor 52 keeps the monitoring signal TSREADY indicating that the value of the sense signal TEMPOP is undefined, at the low voltage level.

At the same point of time at which the monitoring signal TSREADY shifts back to the high voltage level, the control signal TRAN shifts to the high voltage level. As described above, when the control signal TRAN shifts to the high voltage level, the sense signal TEMPOP is latched by the first latch circuit 61. As a result, the value of the detection signal T1 output from the first latch circuit 61 is updated.

Afterward, when the oscillation signal TSEN rises, the sense signal TEMPOP is latched inside the temperature sensor 52 and its value is fixed. Because temperature measurement by the temperature sensor 52 has been completed at this point of time, the value of the sense signal TEMPOP output from the temperature sensor 52 is not changed at this point of time.

FIGS. 7 to 10 are timing charts for explaining operations of the detection signal generator 40.

Figure 5:
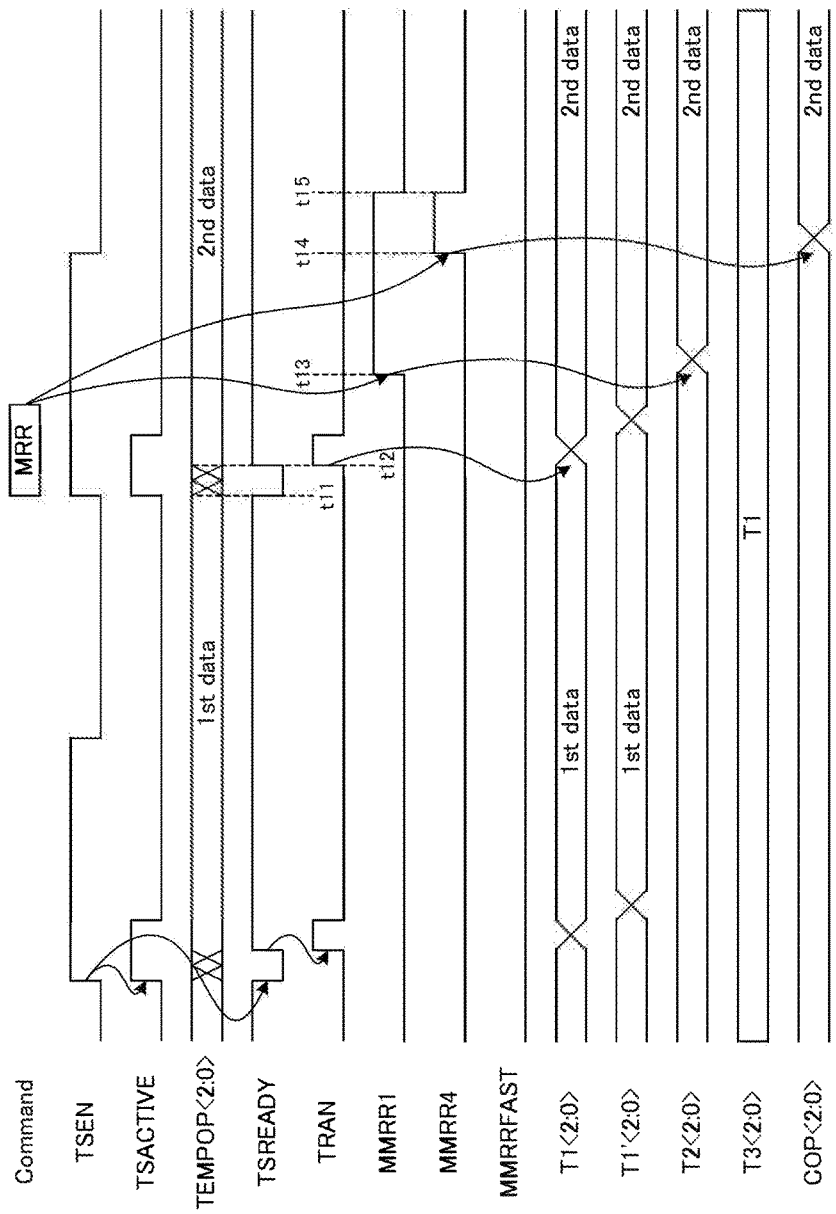
FIG. 5 is a first timing chart for explaining an operation of the detection signal generator.

In the example of FIG. 5, a period during which the monitoring signal TSREADY stays at low voltage level does not overlap a period during which the control signal MMRR1 stays at a high voltage level.

Specifically, the monitoring signal TSREADY shifts to the low voltage level at time t11 and shifts back to the high voltage level at time t12. Afterward, the control signal MMRR1 shifts to the high voltage level at time t13 and shifts back to the low voltage level at time t15.

In this case, the SR latch circuit 54 shown in FIG. 3 is kept in its reset state, in which case the control signal MMRRFAST is kept at the low voltage level. As a result, the selector 53 constantly selects the detection signal T1. In other words, the value of the detection signal T3 constantly matches the value of the detection signal T1.

When the control signal MMRR4 shifts to the high voltage level at time t14, the detection signal T3 is latched by the third latch circuit 63 and therefore the value of the detection signal COP is updated.

In this manner, in the example of FIG. 5, the detection signal T1 (2nd data) is constantly used as the detection signal T3. This allows the latest temperature information to be transferred to the data input/output circuit 24. In addition, under the condition of FIG. 5, almost simultaneous activation of the control signal TRAN and the control signal MMRR4 does not occur. For this reason, the detection signal T3 with its value undefined is not latched by the third latch circuit 63.

At time t13, because the control signal MMRR1 shifts to the high voltage level at this point, the second latch circuit 62 latches the delayed detection signal T1'. As a result, the value of the detection signal T2 output from the second latch circuit 62 is updated at time t13. However, because the control signal MMRRFAST is kept at the low voltage level under the condition of FIG. 5, the detection signal T2 output from the second latch circuit 62 is not used under this condition.

Figure 6:
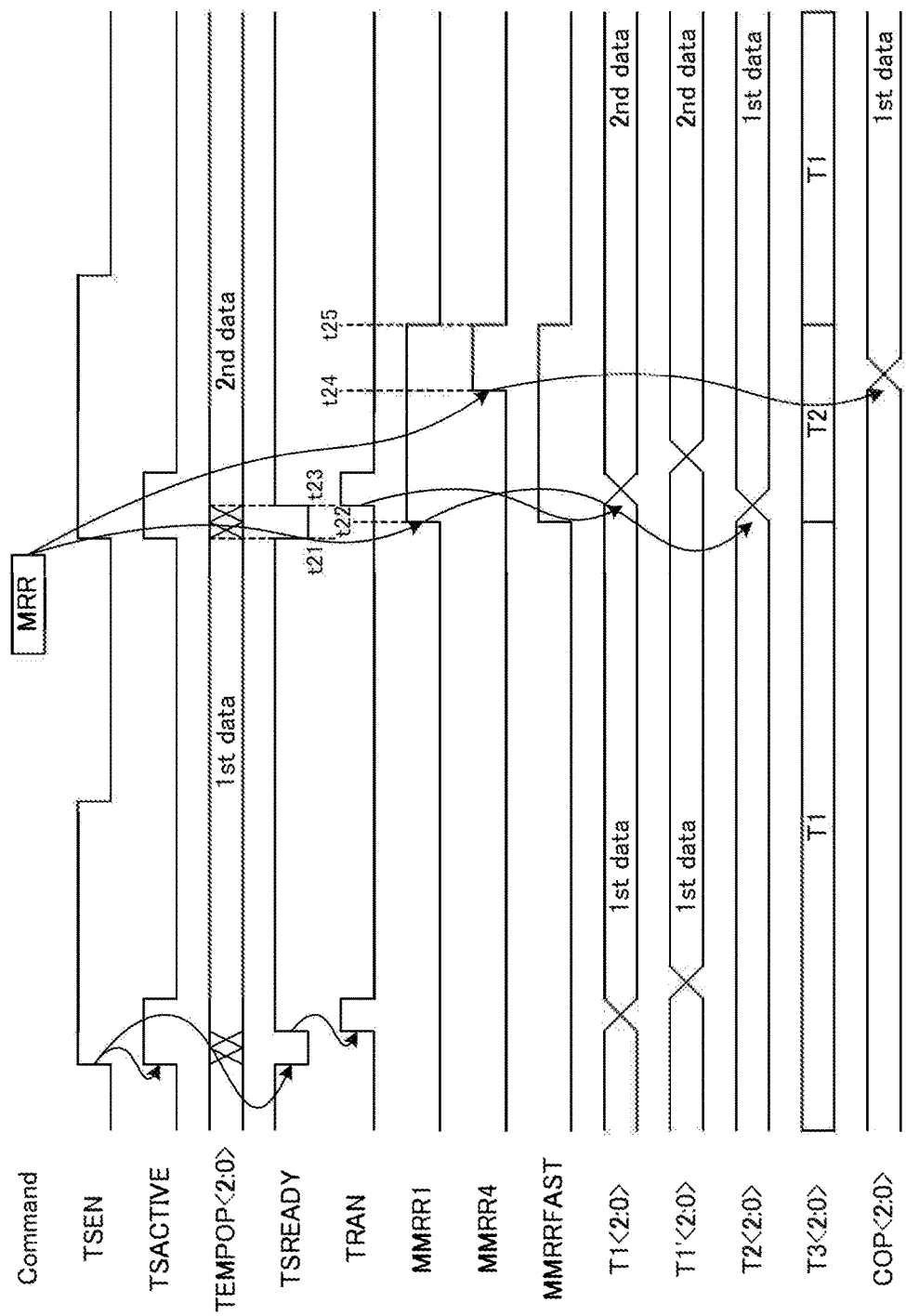
FIG. 6 is a second timing chart for explaining an operation of the detection signal generator.

In the example of FIG. 6, a period during which the monitoring signal TSREADY stays at the low voltage level overlaps a period during which the control signal MMRR1 stays at the high voltage level.

Specifically, after the monitoring signal TSREADY shifts to the low voltage level at time t21, the control signal MMRR1 shifts to the high voltage level at time t22 before the monitoring signal TSREADY shifts back to the high voltage level at time t23. Afterward, the control signal MMRR4 shifts to the high voltage level at time t24 and then the control signals MMRR1 and MMRR4 shift back to the low voltage level at time t25.

In this case, the SR latch circuit 54 shifts to set state at time t22 and remains in this state until time t25. During the period between time t22 and time t25, therefore, the control signal MMRRFAST stays at the high voltage level. In other words, during the period between time t22 and time t25, the selector 53 selects the detection signal T2 and outputs it as the detection signal T3.

Meanwhile, when the control signal MMRR1 shifts to the high voltage level at time t22, the second latch circuit 62 latches the delayed detection signal T1'. As a result, the value of the detection signal T2 output from the second latch circuit 62 is updated at time t22.

When the control signal MMRR4 shifts to the high voltage level at time t24, the third latch circuit 63 latches the detection signal T3. As a result, the value of the detection signal COP is updated.

In this manner, in the example of FIG. 6, the detection signal T2 (1st data) is used as the detection signal T3. Even under a condition that provides a possibility of almost simultaneous activation of the control signal TRAN and the control signal MMRR4, therefore, the detection signal T3 with its value undefined is not latched by the third latch circuit 63 because the detection signal T1 is not used.

Figure 7:
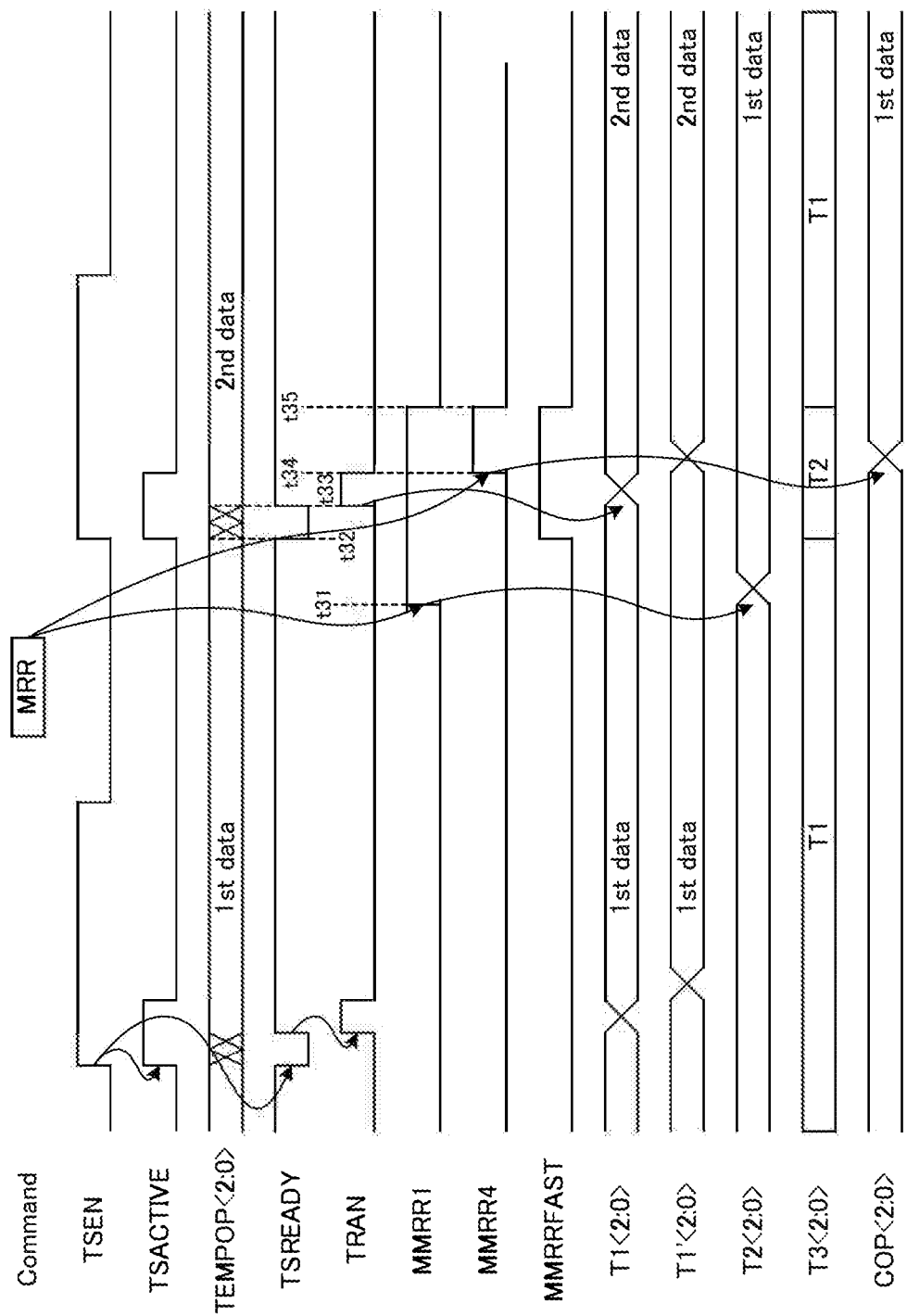
FIG. 7 is a third timing chart for explaining an operation of the detection signal generator.

In the example of FIG. 7, a period during which the monitoring signal TSREADY stays at the low voltage level overlaps a period during which the control signal MMRR1 stays at the high voltage level, as in the example of FIG. 6.

Specifically, after the control signal MMRR1 shifts to the high voltage level at time t31, the monitoring signal TSREADY shifts to the low voltage level at time t32 before the control signal MMRR1 shifts back to the low voltage level at time t35. Afterward, the monitoring signal TSREADY shifts back to the high voltage level at time t33 and the control signal MMRR4 shifts to the high voltage level at time t34.

In this case, the SR latch circuit 54 shifts to set state at time t32 and remains in this state until time t35. During the period between time t32 and time t35, therefore, the control signal MMRRFAST stays at the high voltage level. In other words, during the period between time t32 and time t35, the selector 53 selects the detection signal T2 and outputs it as the detection signal T3.

Meanwhile, when the control signal MMRR1 shifts to the high voltage level at time t31, the second latch circuit 62 latches the delayed detection signal T1'. As a result, the value of the detection signal T2 output from the second latch circuit 62 is updated at time t31.

When the control signal MMRR4 shifts to the high voltage level at time t34, the third latch circuit 63 latches the detection signal T3. As a result, the value of the detection signal COP is updated.

In this manner, in the example of FIG. 7, the detection signal T2 (1st data) is used as the detection signal T3, as in the example of FIG. 6. Even under a condition that provides a possibility of almost simultaneous activation of the control signal TRAN and the control signal MMRR4, therefore, the detection signal l3 with its value undefined is not latched by the third latch circuit 63 because the detection signal T1 is not used.

Figure 8:
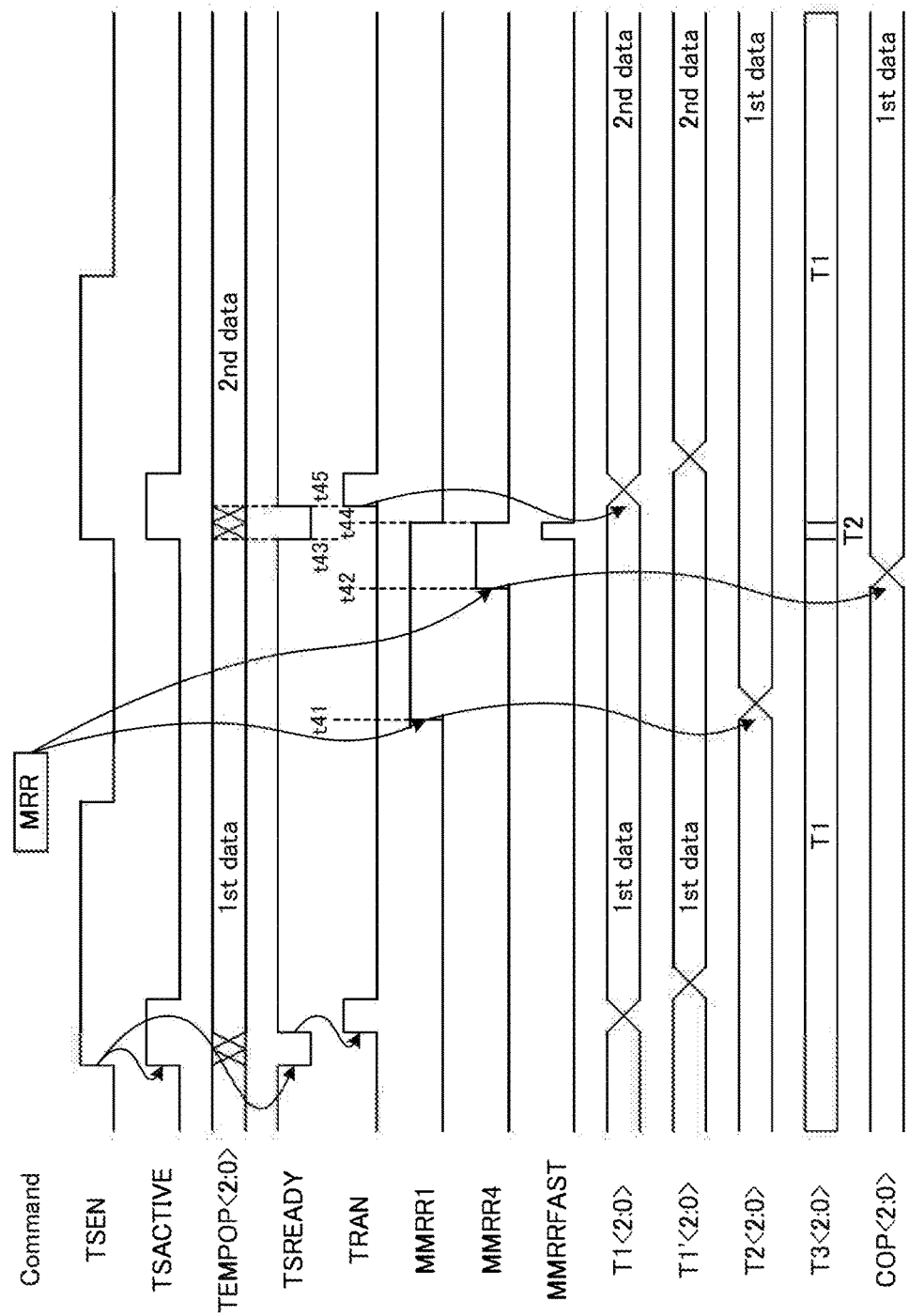
FIG. 8 is a fourth timing chart for explaining an operation of the detection signal generator.

In the example of FIG. 8, a period during which the monitoring signal TSREADY stays at the low voltage level overlaps a period during which the control signal MMRR1 stays at the high voltage level, as in the example of FIG. 6.

Specifically, after the control signal MMRR1 shifts to the high voltage level at time t41, the monitoring signal TSREADY shifts to the low voltage level at time t43 before the control signal MMRR1 shifts back to the low voltage level at time t44. Afterward, the monitoring signal TSREADY shifts back to the high voltage level at time t45. The control signal MMRR4 shifts to the high voltage level at time t42.

In this case, the SR latch circuit 54 shifts to set state at time t44 and remains in this state until time t45. During the period between time t44 and time t45, therefore, the control signal MMRRFAST stays at the high voltage level. In other words, during the period between time t44 and time t45, the selector 53 selects the detection signal T2.

At this point of time, time t42 at which the MMRR4 shifts to the high voltage level belongs to the past. The third latch circuit 63, therefore, latches the detection signal T3 having passed through the first latch circuit 61. In other words, the detection signal T2 output from the second latch circuit 62 is not used.

In this manner, in the example of FIG. 8, the detection signal T1 (1st data) is used as the detection signal T3. This allows the latest temperature information to be transferred to the data input/output circuit 24. In addition, under the condition of FIG. 8, almost simultaneous activation of the control signal TRAN and the control signal MMRR4 does not occur. For this reason, the detection signal T3 with its value undefined is not latched by the third latch circuit 63.

As described above, according to the detection signal generator 40 of this embodiment, when the first latch circuit 61 and the third latch circuit 63 may possibly perform their latching actions almost simultaneously, the detection signal T2 from the second latch circuit 62 is selected. This prevents a case where the detection signal T3 with its value undefined is latched by the third latch circuit 63 as a result of overlapping latching actions.

A possibility that the first latch circuit 61 and the third latch circuit 63 perform their latching actions almost simultaneously can be detected by watching the monitoring signal TSREADY and the control signal MMRR1. Specifically, given the fact that the monitoring signal TSREADY stays at the low voltage level during a given period (e.g., period between time t11 and time t12) before a point of time of activation of the control signal TRAN, knowing the monitoring signal TSREADY is at the low voltage level leads to a conclusion that activation of the control signal TRAN is near. Likewise, given the fact that the control signal MMRR1 stays at the high voltage level during a given period (e.g., period between time t13 and time t14) before a point of time of activation of the control signal MMRR4, knowing the control signal MMRR1 is at the high voltage level leads to a conclusion that activation of the control signal MMRR4 is near.

Based on the above features, according to this embodiment, when the control signal MMRR1 shifts to the high voltage level in a period during which the monitoring signal TSREADY stays at the low voltage level, the selector 53 switches transfer gate connection and selects the detection signal T2. As a result, when the first latch circuit 61 and the third latch circuit 63 may possibly perform their latching actions almost simultaneously, the detection signal T3 with its value undefined is not latched by the third latch circuit 63.

The semiconductor device including the temperature sensor has been described in the above embodiments. The present invention may be applied not only to such a semiconductor device but also to a wide variety of semiconductor devices having physical quantity sensors.

It is apparent that the present invention is not limited to the above embodiments, but may be modified and changed without departing from the scope and spirit of the invention.

What is claimed is:

1. An apparatus comprising:
    a sensor configured to operate intermittently and provide a sense signal and a monitoring signal that activates during an operation period of the sensor;
    a first logic circuit configured to provide a first read command signal and then a second read command signal responsive to a mode register read command;
    a second logic circuit configured to supply a control signal responsive to the monitoring signal and the first read command signal; and
    a third logic circuit configured to latch a signal generated based on the sense signal responsive to the second read command signal and the control signal.

2. The apparatus of claim 1, further comprising a first latch circuit configured to receive the sense signal.

3. The apparatus of claim 2, further comprising a second latch circuit configured to receive an output signal of the first latch circuit.

4. The apparatus of claim 3, wherein the third logic circuit includes a selector and a third latch circuit coupled to the selector.

5. The apparatus of claim 4, wherein the selector is configured to couple an output node thereof to one of output nodes of the first and second latch circuits responsive to the control signal.

6. The apparatus of claim 5, wherein the third latch circuit is configured to latch an output signal provided at the output node of the selector responsive to the second read command signal.

7. The apparatus of claim 3, further comprising a delay circuit between the first latch circuit and the second latch circuit.

8. The apparatus of claim 1, wherein the first logic circuit is synchronized to a clock signal and configured to provide the second read command signal a number of pulses of the clock signal after providing the first read command signal.

9. An apparatus comprising:
    a sensor configured to measure a property of a memory device, update a value of a sense signal based on the measured property, provide a first control signal after the value of the sense signal is updated, and provide a monitor signal while the sense signal is being updated;
    a first logic circuit configured to latch the value of the sense signal responsive to the first control signal and provide the latched value as a first measurement signal;
    a second logic circuit configured to latch the value of the first measurement signal responsive to a read command signal and provide the latched value as a second measurement signal;
    a third logic circuit configured to provide the first measurement signal or the second measurement signal as an output signal based on the monitor signal and the read command signal .

10. The apparatus of claim 9, wherein the second logic circuit comprises latch circuit and a delay circuit coupled between the first measurement signal and an input node of the latch circuit.

11. The apparatus of claim 9, further comprising an oscillator configured to provide an oscillation signal to the sensor, wherein the sensor intermittently updates the value of the sense signal responsive to the oscillation signal.

12. The apparatus of claim 9, further comprising a fourth logic circuit configured to provide the read command signal at a first time, and a second read command signal at a second time after the first time responsive to a mode register read command.

13. The apparatus of claim 12, wherein the third logic circuit comprises a selection signal generator configured to provide a selection signal responsive to the read command signal and the monitor signal.

14. The apparatus of claim 13, wherein the third logic circuit further comprises a selector configured to provide the first measurement signal or the second measurement signal as a third measurement signal based on the selection signal.

15. The apparatus of claim 14, wherein the third logic circuit comprises a latch circuit configured to latch a value of the third measurement signal responsive to the second read command signal and provide it as the output signal.

16. An apparatus comprising:
    a sensor configured to intermittently update a value of a sense signal from a previous value to a current value, wherein the sensor is configured to provide a monitor signal during the updating; and
    a first logic circuit configured to provide a first read signal at a first time and a second read signal at a second time after the first time;
    a second logic circuit configured to provide a control signal based on the monitor signal and the first read signal; and
    a third logic circuit configured to provide the current value of the sense signal or the previous value of the sense signal based on the control signal.

17. The apparatus of claim 16, wherein the sensor comprises a temperature sensor configured to measure a temperature of a memory device, and update the value of the sense signal based on the measured temperature.

18. The apparatus of claim 16, wherein the sensor is further configured to provide a first control signal after updating the value of the sense signal, and wherein the third logic circuit comprises a first latch circuit configured to latch the current value of the sense signal responsive to the first control signal.

19. The apparatus of claim 18, wherein the third logic circuit further comprises a second latch circuit configured to latch a value on an input of the second latch circuit responsive to the second read signal and a delay circuit coupled between an output of the first latch circuit and the input of the second latch circuit.

20. The apparatus of claim 19, wherein the third logic circuit further comprises a selector and a third latch circuit, wherein the selector is configured to provide either the current value or the previous value to an input of the third latch circuit, and wherein the third latch circuit is configured to latch a value on the input of the third latch circuit responsive to the second read signal.

21. The apparatus of claim 16, wherein the first logic circuit is configured to provide the first read signal and second read signal responsive to a mode register read command.

\* \* \* \* \*